United States Patent
Nefcy et al.

(10) Patent No.: US 9,533,673 B2
(45) Date of Patent: Jan. 3, 2017

(54) METHODS AND SYSTEM FOR IMPROVING HYBRID DRIVELINE OPERATION

(71) Applicant: Ford Global Technologies, LLC, Dearborn, MI (US)

(72) Inventors: Bernard D. Nefcy, Novi, MI (US); Matthew John Shelton, Grosse Ile, MI (US); Felix Nedorezov, Rochester Hills, MI (US); Todd McCullough, Bloomfield Hills, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 14/470,869

(22) Filed: Aug. 27, 2014

(65) Prior Publication Data

US 2016/0059840 A1    Mar. 3, 2016

(51) Int. Cl.
| | |
|---|---|
| *B60L 9/00* | (2006.01) |
| *B60W 20/00* | (2016.01) |
| *B60W 10/02* | (2006.01) |
| *B60W 10/11* | (2012.01) |
| *B60W 10/08* | (2006.01) |
| *B60W 10/06* | (2006.01) |
| *B60K 6/547* | (2007.10) |
| *B60W 30/18* | (2012.01) |
| *B60W 30/19* | (2012.01) |
| *B60K 6/48* | (2007.10) |

(52) U.S. Cl.
CPC ............... *B60W 20/10* (2013.01); *B60K 6/547* (2013.01); *B60W 10/02* (2013.01); *B60W 10/06* (2013.01); *B60W 10/08* (2013.01); *B60W 10/11* (2013.01); *B60W 20/30* (2013.01); *B60W 30/18072* (2013.01); *B60W 30/19* (2013.01); *B60K 2006/4825* (2013.01); *B60W 2510/081* (2013.01); *B60W 2540/10* (2013.01); *B60W 2710/021* (2013.01); *B60W 2710/1005* (2013.01); *Y10S 903/912* (2013.01); *Y10S 903/93* (2013.01)

(58) Field of Classification Search
USPC .......................................................... 701/22
See application file for complete search history.

(56) References Cited

U.S. PATENT DOCUMENTS

| | | | |
|---|---|---|---|
| 6,503,170 B1 * | 1/2003 | Tabata ................ | F16H 59/0204 475/254 |
| 8,204,659 B2 | 6/2012 | Kouno et al. | |

(Continued)

OTHER PUBLICATIONS

Anonymous, "Intermediate Torque Transfer in 4-Element Power-On Downshift," IPCOM No. 000239992, Published Dec. 19, 2014, 2 pages.

*Primary Examiner* — Hussein A. Eichanti
(74) *Attorney, Agent, or Firm* — David Kelley; Alleman Hall McCoy Russell & Tuttle LLP

(57) ABSTRACT

Systems and methods for improving transmission gear shifting of a hybrid vehicle are presented. The systems and methods prepare the hybrid vehicle for conditions that may occur after a requested gear shift is performed. In one example, a motor speed that would occur after a downshift, if the downshift were allowed to occur, is determined and control actions may be taken in response to the predicted motor speed.

13 Claims, 5 Drawing Sheets

(56) References Cited

U.S. PATENT DOCUMENTS

| | | | |
|---|---|---|---|
| 2008/0176708 A1* | 7/2008 | Tamai | F16H 61/16 477/125 |
| 2009/0145673 A1* | 6/2009 | Soliman | B60K 6/442 180/65.1 |
| 2013/0291830 A1* | 11/2013 | Doering | F02D 41/023 123/350 |
| 2013/0296125 A1* | 11/2013 | Gibson | B60W 20/10 477/5 |
| 2013/0297122 A1* | 11/2013 | Gibson | B60W 20/40 701/22 |
| 2014/0148986 A1* | 5/2014 | Yoshikawa | B60W 20/10 701/22 |
| 2014/0378273 A1* | 12/2014 | Gibson | B60W 20/00 477/5 |

* cited by examiner

METHODS AND SYSTEM FOR IMPROVING HYBRID DRIVELINE OPERATION

FIELD

The present description relates to methods and a system for operating a driveline of a hybrid vehicle. The methods may be particularly useful for hybrid vehicles that include a driveline disconnect clutch and an automatic transmission that includes stepped ratio gears.

BACKGROUND AND SUMMARY

A hybrid vehicle may include a driveline disconnect clutch for selectively mechanically coupling an engine to a motor and transmission. The disconnect clutch may allow the motor to propel the vehicle while the engine is stopped to reduce an amount of energy used to propel the hybrid vehicle. The motor may operate more efficiently than the engine where the vehicle is being operated at low speeds and low driver demand torque levels. Therefore, it may be desirable to not operate the engine at low vehicle speeds and low driver demand torque levels to conserve hydrocarbon based fuel. Nevertheless, if a driver increases a driver demand torque, the driveline disconnect clutch may be closed to increase torque output from the vehicle's driveline to meet driver demand torque. To reduce a possibility of driveline degradation, a driveline disconnect clutch having a large inertia may be needed to allow the driveline disconnect clutch to operate over a wide range of driveline operating conditions. However, if a driveline disconnect clutch has a large inertia and is installed in the hybrid vehicle, vehicle fuel economy may degrade. Therefore, it may be desirable to provide a hybrid vehicle that includes a lower inertia driveline disconnect clutch, but exhibits a reduced possibility of driveline degradation.

The inventors herein have recognized the above-mentioned disadvantages and have developed a driveline method, comprising: closing an open driveline disconnect clutch in response to an estimated motor speed after a requested transmission gear downshift.

By estimating a speed of a motor in response to a requested transmission gear downshift, it may be possible to provide the technical result of reducing driveline disconnect degradation. Specifically, a speed that a motor rotates immediately after a new gear is engaged may be a basis for judging whether or not to close a driveline disconnect clutch before the new gear is actually engaged. If the motor speed after engaging the new gear would be greater than a threshold speed, an open driveline disconnect clutch may be closed before the new gear is engaged to reduce the possibility of driveline disconnect clutch degradation. For example, if a driver manually requests a lower gear than a present gear, an open driveline disconnect clutch may be closed if engaging the lower gear would increase motor speed to a speed where increased driveline disconnect clutch degradation may be present when the driveline disconnect clutch is closed. The lower gear may be engaged after the driveline disconnect clutch is closed. In this way, it may be possible to avoid operating the driveline disconnect clutch at speeds where driveline disconnect clutch closing may cause driveline disconnect clutch degradation. Consequently, it may be possible to operate the driveline with a driveline disconnect clutch that has lower inertia.

The present description may provide several advantages. For example, the approach may reduce the possibility of driveline disconnect clutch degradation. Further, the approach may increase vehicle efficiency by lowering driveline inertia while still allowing the driveline to operate over a wide range of operating conditions. Additionally, the approach may provide a way to anticipate and prepare for the possibility of higher driver demand torque.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to improving hybrid vehicle driveline operation. For example, a driveline method may include closing an open driveline disconnect clutch in response to an estimated motor speed after a requested transmission gear downshift. For example, the closing from an open driveline disconnect clutch to a fully closed driveline disconnect clutch condition may be not only in response to an estimated motor speed, but also responsive to the requested transmission gear downshift. In a first condition, the clutch may not be closed (e.g., maintained open) be responsive to estimated motor speed when there is not a requested transmission gear downshift, but in a second condition, the clutch may be closed responsive to estimated motor speed only when a requested transmission gear downshift is received. In still another condition, the clutch may be closed responsive to other, different parameters other than estimated motor speed when there is not a requested transmission gear downshift.

Figure 1:
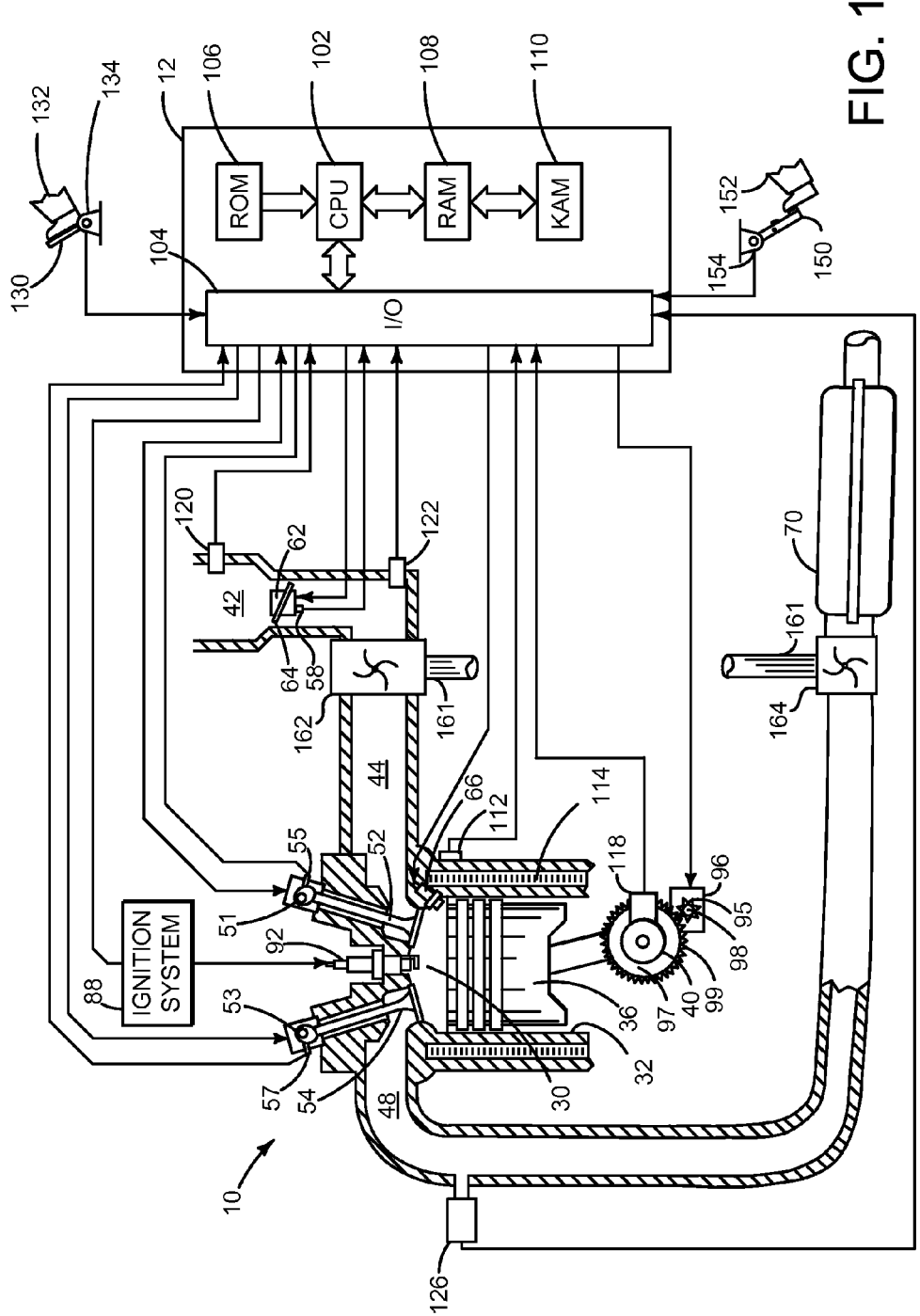
FIG. 1 is a schematic diagram of an engine.
Figure 2:
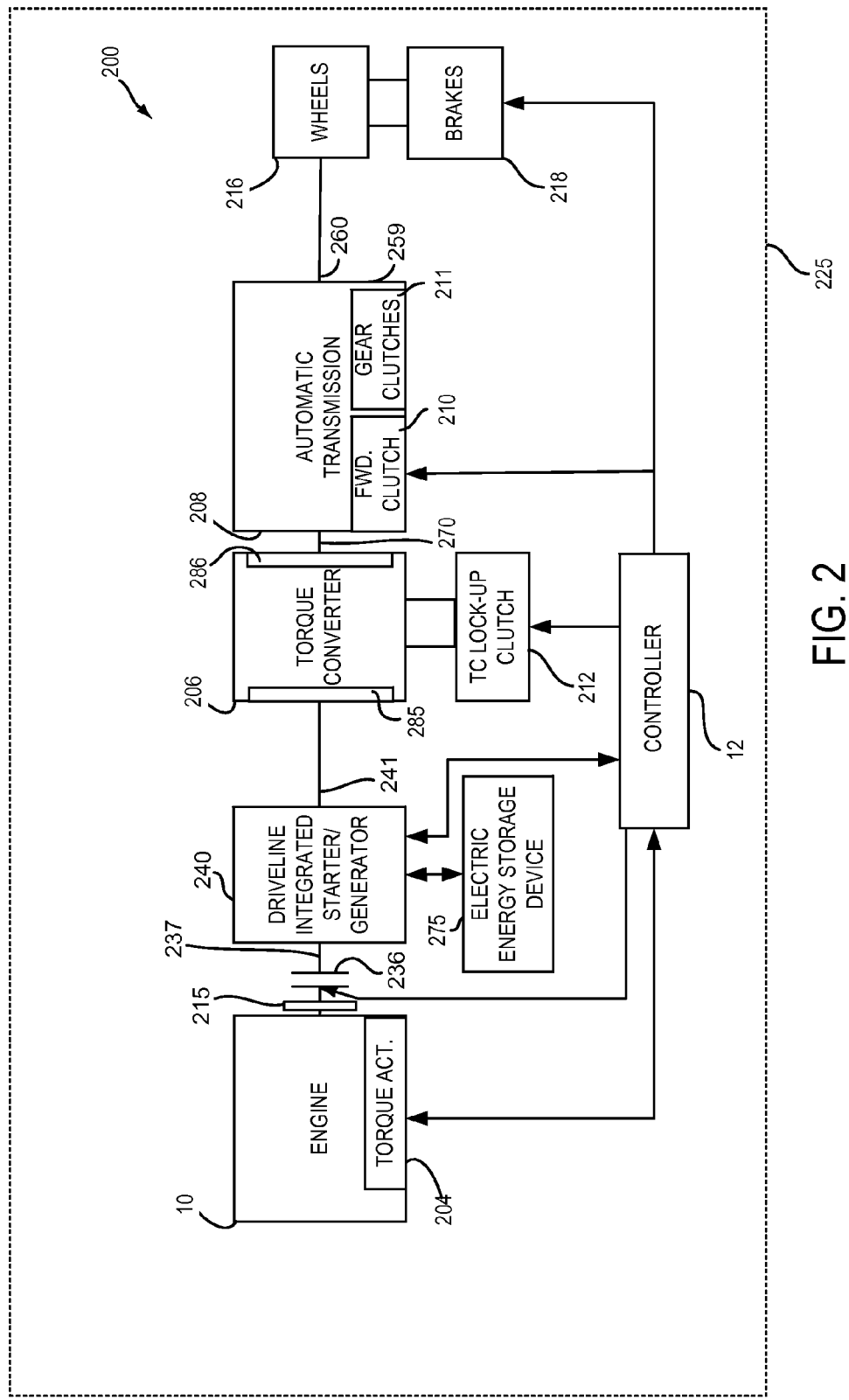
FIG. 2 shows an example vehicle driveline configuration.
Figure 3:
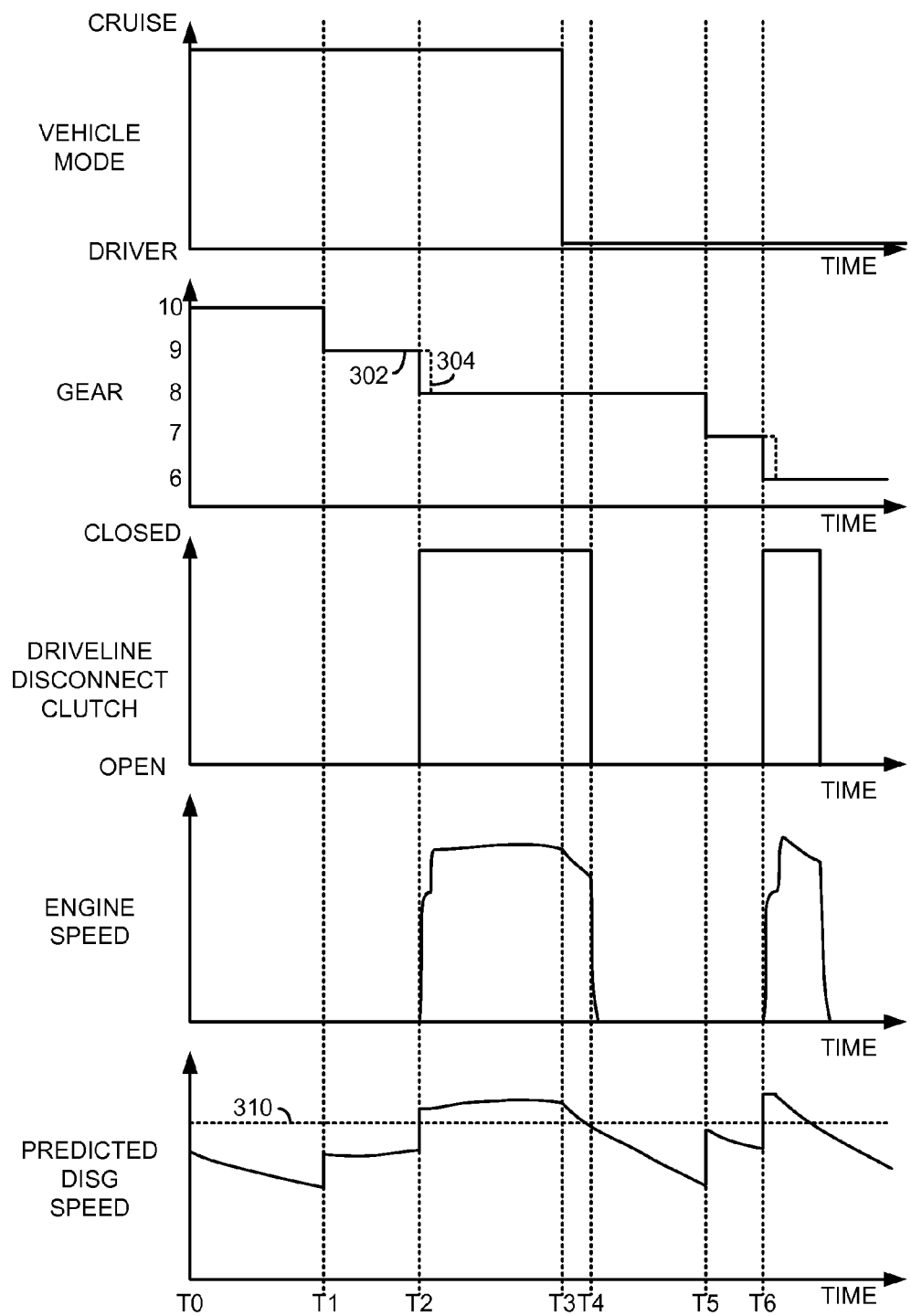
FIG. 3 shows an example vehicle driving sequence.

Turning to FIG. 1, a hybrid vehicle may include an engine as is shown. Further, the engine may be included in a driveline of the hybrid vehicle as is shown in FIG. 2. The vehicle may operate as is shown in the sequence of FIG. 3. A driveline disconnect clutch may be controlled in response to requested gear changes according to the method of FIGS. 4A and 4B.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; an electric machine; an automatic transmission; a controller including executable instructions stored in non-transitory memory for declining a requested gear downshift of the automatic transmission in response to a predicted speed of the electric machine or allowing the requested gear downshift of the automatic transmission in response to the predicted speed of the electric machine. The driveline system includes where the requested gear downshift is declined in response to the predicted speed of the electric machine being greater than a threshold speed, and where the requested gear downshift is allowed in response to the predicted speed of the electric machine being less than the threshold speed.

In some examples, the driveline system further comprises a driveline disconnect clutch and additional instructions for closing the driveline disconnect clutch when the driveline disconnect clutch is open in response to the requested gear downshift and the predicted speed of the electric machine not being less than a threshold speed. The driveline system further comprises additional instructions for supplying spark and fuel to the engine in response to closing the driveline disconnect clutch and rotating the engine. The driveline system further comprises additional instructions for allowing engagement of a new gear in response to the requested gear downshift when the predicted speed of the electric machine is less than a threshold speed and when a predicted output torque of the electric machine is within a predetermined torque range. The driveline system further comprises a driveline disconnect clutch and additional instructions for operating a vehicle in a cruise control mode and closing the driveline disconnect clutch in response to the predicted speed of the electric machine in response to the requested gear downshift.

Figure 4A:
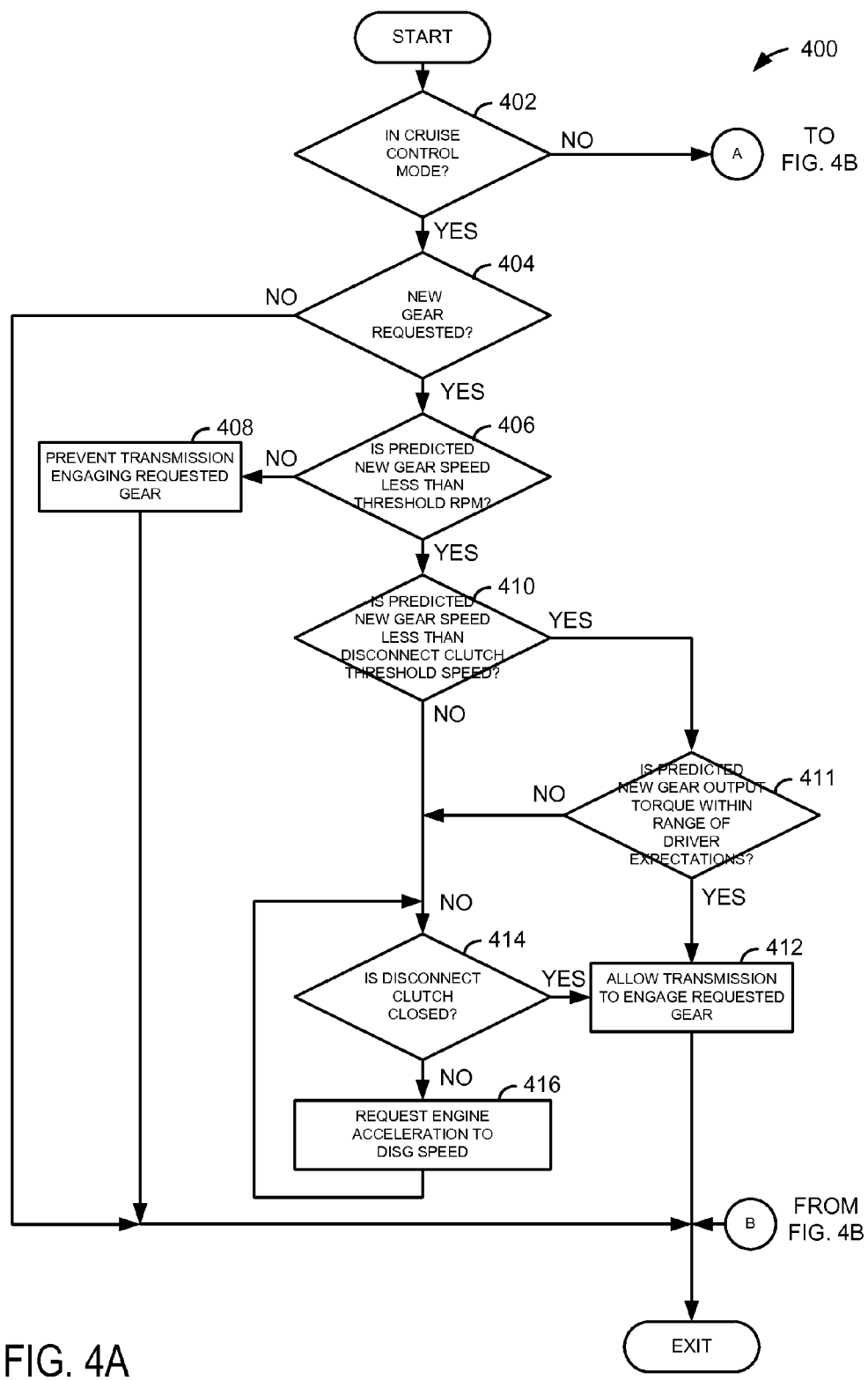
FIGS. 4A and 4B show an example method for operating a hybrid vehicle driveline.
Figure 4B:
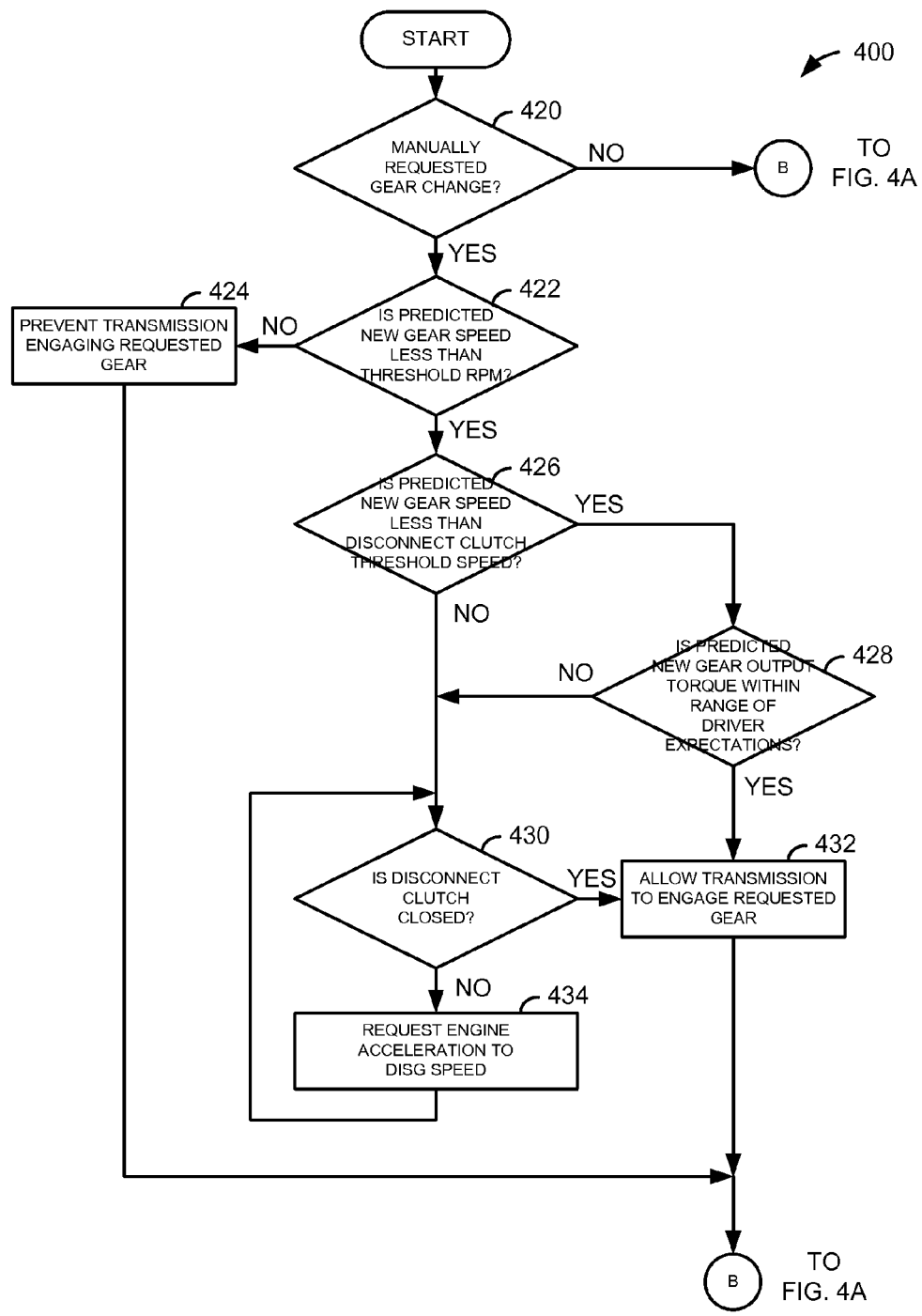

Referring now to FIG. 3, an example vehicle driving sequence according to the method of FIGS. 4A and 4B are shown. The sequences of FIG. 3 may be provided by the system of FIGS. 1 and 2 executing the method of FIGS. 4A and 4B.

The first plot from the top of FIG. 3 is a plot of vehicle mode versus time. The vehicle mode may be cruise control mode or driver demand mode. The vehicle mode is cruise control mode when the trace is near the Y axis arrow. The vehicle mode is driver demand mode when the trace is near the X axis. Cruise control mode is a mode where a driver provides a desired vehicle speed and a controller adjusts engine and/or DISG torque to maintain vehicle speed at the desired vehicle speed. Vehicle speed may be allowed to vary a small amount (e.g., +5 KPH) about the desired vehicle speed. In driver demand mode, a driver provides a torque value via an accelerator pedal or similar device. The accelerator pedal position and vehicle speed are a basis for determining driver demand torque. The driver demand torque is split between and provided by the engine and the DISG. The X axis represents time and time increases from the left side of FIG. 3 to the right side of FIG. 3.

The second plot from the top of FIG. 3 is a plot of transmission gear versus time. The Y axis represents transmission gear and gear numbers are indicated at different levels along the Y axis. The gear numbers increase in the direction of the Y axis arrow. The solid trace 302 represents selected gear. The dashed trace 304 represents active or engaged gear. The engaged gear is the same as the selected gear when only trace 302 is visible. The selected and active gears are indicated by the selected and active traces being at the level of a particular gear along the Y axis. The X axis represents time and time increases from the left side of FIG. 3 to the right side of FIG. 3.

The third plot from the top of FIG. 3 is a plot of driveline disconnect clutch state versus time. The Y axis represents driveline disconnect clutch state. The driveline disconnect clutch is closed when the trace is at a level near the Y axis arrow. The driveline disconnect clutch is open when the trace is at a level near the X axis. The X axis represents time and time increases from the left side of FIG. 3 to the right side of FIG. 3. Horizontal line 310 represents a threshold speed. If the predicted DISG speed is greater than threshold 310, the driveline disconnect clutch is closed before the new gear is engaged.

The fourth plot from the top of FIG. 3 is a plot of engine speed versus time. The Y axis represents engine speed and engine speed increases in the direction of the Y axis arrow. The X axis represents time and time increases from the left side of FIG. 3 to the right side of FIG. 3.

The fifth plot from the top of FIG. 3 is a plot of predicted DISG or motor speed versus time. The predicted DISG speed is equal to the actual DISG speed unless a new gear is selected. If a new gear is selected, the predicted DISG speed is based on the gear ratio change and other parameters described in greater detail in the description of FIGS. 4A and 4B. The predicted DISG speed transitions to the actual DISG speed once a gear shift is completed. The X axis represents time and time increases from the left side of FIG. 3 to the right side of FIG. 3.

At time T0, the vehicle is in cruise control mode and vehicle speed is being maintained at a desired vehicle speed via controller 12 shown in FIG. 1. Controller 12 adjusts current supplied to the DISG control DISG torque and to maintain the desired vehicle speed since engine speed is zero and the engine is not rotating. The DISG torque may be increased to maintain vehicle speed if the vehicle starts to ascend a hill. Further, the transmission may be shifted automatically based on the DISG torque and vehicle speed. The transmission is in tenth gear and the driveline disconnect clutch is open so that the DISG does not have to rotate the engine. In this example, the vehicle is ascending a hill and DISG speed is being reduced since the DISG does not have torque capacity to maintain vehicle speed.

At time T1, a gear downshift from tenth gear to ninth gear is requested in an effort to maintain vehicle speed while the vehicle remains in cruise control mode. The predicted DISG speed increases in response to the selected or requested new gear (e.g., ninth gear). The transmission downshifts without closing the driveline disconnect clutch and starting the engine in response to the predicted DISG speed being less than threshold 310.

Between time T1 and time T2, the predicted DISG speed remains constant but the DISG torque increases in an effort to maintain vehicle speed near the desired vehicle speed as the vehicle ascends a hill. The engine remains off (e.g., not combusting and at zero speed) and the driveline disconnect clutch remains in an open state.

At time T2, the selected or requested gear is transitioned from ninth gear to eight gear in response to vehicle speed slowing from the ascending road grade (not shown). The predicted DISG speed increases to a speed greater than level 310. The driveline disconnect clutch is closed and spark and fuel are supplied to start the engine via the DISG in response to the downshift request and predicted DISG speed being greater than threshold 310. The transmission remains in ninth gear as the driveline disconnect clutch is closed and as the engine is started. In one example, the transmission remains in the current gear or old gear until engine speed matches DISG speed and the driveline disconnect clutch is fully closed.

Shortly after time T2, the engine speed has accelerated to DISG speed, the driveline disconnect clutch is fully closed, and the transmission downshifts into the new gear (e.g., eighth gear). The engine and DISG supply torque to the driveline to maintain the desired vehicle speed.

At time T3, the vehicle exits cruise control mode and enters driver demand mode in response to the driver deactivating cruise mode (not shown). The transmission remains in eighth gear and the engine continues to operate. The driveline disconnect clutch also remains closed. The engine speed and DISG speed are reduced as the driver reduces the driver demand torque (not shown).

At time T4, the driveline disconnect clutch is opened and the engine is deactivated (e.g., stops rotating) in response to the reduced driver demand torque (not shown). The transmission remains in eighth gear and engine speed declines toward zero speed. The predicted DISG speed continues to decrease in response to the reduced driver demand torque (not shown).

Between time T4 and time T5, the predicted driver demand torque continues to decline. The vehicle remains in driver demand mode and the transmission remains in eighth gear. The engine speed reaches zero.

At time T5, the driver manually selects seventh gear. The predicted DISG speed increases in response to the downshift request. Further, the predicted DISG speed remains less than level 310. Therefore, the driveline disconnect clutch remains open and the engine remains stopped and not rotating. Also, the transmission shifts into seventh gear in response to the predicted DISG speed being less than level 310.

At time T6, the driver manually requests a downshift to sixth gear. The predicted DISG speed increases in response to the manual request to downshift to sixth gear. Further, the driveline disconnect clutch is closed and spark and fuel are supplied to start the engine in response to the downshift request and the predicted DISG speed exceeding threshold 310. The transmission is not shifted into sixth gear until after the driveline disconnect clutch is closed and the engine speed equals DISG speed. Thus, the downshift is delayed until the driveline disconnect clutch is closed and the engine is started.

In this way, the driveline disconnect clutch may be closed and the engine started in response to the predicted DISG speed exceeding a threshold speed. By closing the driveline disconnect clutch, it may be possible to avoid operating the DISG at higher speeds where closing the driveline disconnect clutch may cause driveline disconnect clutch degradation. Further, by activating the engine and accelerating the engine to DISG speed, the driveline is prepared in case the driver increases the driver demand load to accelerate or maintain vehicle speed. Since the engine is operating and up to DISG speed, the driveline may respond to an increase in driver demand torque without the delay of closing the driveline disconnect clutch and running engine speed up to DISG speed.

Referring now to FIGS. 4A and 4B, a method for operating a hybrid vehicle driveline is shown. The method of FIGS. 4A and 4B may provide the operating sequence shown in FIG. 3. Additionally, the method of FIGS. 4A and 4B may be included in the system of FIGS. 1 and 2 as executable instructions stored in non-transitory memory.

At 402, method 400 judges if the vehicle is in a cruise control mode. The vehicle may be judged to be in a cruise control mode when a driver operates switches or a display and a bit in memory is set to a value of one to indicate cruise control mode is activated. In cruise control mode, DISG torque and/or engine torque may be adjusted to maintain vehicle speed at a constant speed. If method 400 judges that the vehicle is in cruise control mode, the answer is yes and method 400 proceeds to 404. Otherwise, the answer is no and method 400 proceeds to 420. The vehicle is in driver demand mode when the answer is no. In driver demand mode, a driver requests torque from the driveline via an accelerator pedal or other device and the torque is provided via the DISG, the DISG and the engine, or the engine.

At 420, method 400 judges if there is a manual request to change transmission gears. The driver may manually request a gear change via a selector or applying switches. In some examples, method 400 may proceed to 422 when a gear downshift (e.g., a shift to a lower gear such as a shift from fourth gear to third gear) is requested. If method 400 judges that a manual gear shift is selected, the answer is yes and method 400 proceeds to 422. Otherwise, the answer is no and method 400 proceeds to exit.

At 422, method 400 judges whether or not a predicted new gear speed is less than a threshold speed. The new gear speed may be a speed that the DISG would be at if the requested or new gear where engaged. In one example, the predicted speed is determined by the following equation:

$$N_{pred} = (Ratio_{cur} - Ratio_{new}) \cdot \left(N_{DISG} + f\left(N_{DISG}, \frac{d}{dt}N_{DISG}, T_{max\_eng}, J_{eng}\right)\right)$$

Where $N_{pred}$ is the predicted DISG speed after a gear shift, $Ratio_{curr}$ is the current gear ratio, $Ratio_{new}$ is the new gear ratio, $N_{DISG}$ is the DISG speed, $T_{max\_eng}$ is maximum engine torque, $J_{eng}$ is engine inertia, and where f is an empirically determined function with a NDISG input. In one example, the threshold speed may be a maximum or rated speed of the DISG. If the predicted DISG speed is not less than the threshold speed, the answer is no and method 400 proceeds to 424. Otherwise, the answer is yes and method 400 proceeds to 426. In some examples, method 400 may also require driver demand torque be less than a threshold level or zero to proceed to 426.

At 424, method 400 prevents the transmission from shifting into the requested new gear. In one example, method 400 prevents the shift by not allowing working fluid to flow to the clutch that actuates the requested gear. Further, the presently engaged gear remains engaged. Method 400 proceeds to exit after the gear shift is prevented.

At 426, method 400 judges if the predicted new gear or DISG speed is less than a threshold driveline disconnect speed. In one example, the threshold driveline disconnect speed is a rated or maximum allowable DISG speed which is not to be exceeded. If method 400 judges that the predicted DISG speed is less than the threshold speed, the answer is yes and method 400 proceeds to 428. Otherwise, the answer is no and method 400 proceeds to 430.

Alternatively, or in addition, in some examples method 400 judges whether or not a predicted driveline disconnect clutch power is less than a threshold level. If the predicted driveline disconnect clutch power is less than the threshold level, the answer is yes and method 400 proceeds to 428. The predicted driveline disconnect power is determined by multiplying the predicted DISG speed by the predicted driveline disconnect clutch torque. The predicted driveline disconnect clutch torque may be determined via the following equations:

$$I_{impeller} \cdot \dot{N}_{impeller} = T_{clutch} + T_{elec\_mach} - T_{conv}$$

Where:

$$T_{conv} = \frac{N_{impeller}^2}{cpc2\left(\frac{N_{turbine}}{N_{impeller}}\right)} + T_{conv\_clutch}$$

Solving for driveline disconnect clutch torque:

$$\hat{T}_{clutch} = I_{impeller} \cdot \dot{N}_{impeller} - T_{elec\_mach} + T_{conv}$$

Where $I_{impeller}$ is the torque converter impeller inertia, $N_{impeller}$ is torque converter impeller speed, $T_{clutch}$ is torque of the driveline disconnect clutch, $T_{elec\_machine}$ is the DISG torque, $T_{conv}$ is torque converter impeller torque, cpc is the torque converter capacity factor, $N_{turbine}$ is the torque converter turbine speed, and $T_{conv\_clutch}$ is the torque converter clutch torque.

At 428, method 400 judges if the new gear output torque is within a range of driver expected torque. The driver expected torque may be based off of a DISG torque curve that is a function of DISG speed. In one example, the new gear output torque is within an expected range if DISG predicted speed is less than a speed where DISG transitions from providing a constant maximum torque to providing a constant maximum power. Thus, the new gear output torque is within an expected range if the predicted DISG speed is less than a threshold speed. If method 400 judges that the new gear output torque is within range of a driver expected torque, the answer is yes and method 400 proceeds to 432. Otherwise, the answer is no and method 400 proceeds to 430.

At 432, method 400 allows the transmission to shift to the requested or new gear whether or not the driveline disconnect clutch is engaged or disengaged. If the driveline disconnect clutch is not engaged, it remains in a not engaged state. The transmission may downshift to the requested or new gear by allowing working fluid to flow to a clutch that applies the new gear. Method 400 proceeds to exit after the new gear is applied.

At 430, method 400 judges if the driveline disconnect clutch is closed. In one example, method 400 may judge that the driveline disconnect clutch is closed if a variable in memory is a value of one. Method 400 may judge that the driveline disconnect clutch is open if the variable is a value of one. In other examples, method 400 may judge that driveline disconnect clutch is closed if a pressure of working fluid supplied to the driveline disconnect clutch is greater than a threshold pressure. If method 400 judges that the driveline disconnect clutch is engaged or closed, the answer is yes and method 400 proceeds to 432. Otherwise, the answer is no and method 400 proceeds to 434.

At 434, method 400 closes the driveline disconnect clutch, starts the engine, and accelerates the engine to DISG speed. The driveline disconnect clutch may partially close initially, open, and then fully closed when engine speed reaches DISG speed. Alternatively, the driveline disconnect clutch may close to accelerate the engine to DISG speed as spark and fuel are delivered to the engine. Method 400 returns to 430 after the driveline disconnect clutch is closed.

At 404, method 400 judges if there is a request to change the transmission gear to a new gear. The new gear may be requested by a controller that is attempting to maintain a constant vehicle speed. In some examples, method 400 may proceed to 406 when a gear downshift (e.g., a shift to a lower gear such as a shift from fourth gear to third gear) is requested. If method 400 judges that there is a request for a new gear, the answer is yes and method 400 proceeds to 406. Otherwise, the answer is no and method 400 proceeds to exit.

At 406, method 400 judges whether or not a predicted new gear speed is less than a threshold speed. The new gear speed may be a speed that the DISG would be at if the requested or new gear where engaged. Method 400 predicts the new DISG speed as described at 422. If the predicted DISG speed is not less than the threshold speed, the answer is no and method 400 proceeds to 408. Otherwise, the answer is yes and method 400 proceeds to 410. In some examples, method 400 may also require driver demand torque be less than a threshold level or zero to proceed to 410.

At 408, method 400 prevents the transmission from shifting into the requested new gear. In one example, method 400 prevents the shift by not allowing working fluid to flow to the clutch that actuates the requested gear. Further, the presently engaged gear remains engaged. Method 400 proceeds to exit after the gear shift is prevented.

At 410, method 400 judges if the predicted new gear or DISG speed is less than a threshold driveline disconnect speed. In one example, the threshold driveline disconnect speed is a rated or maximum allowable DISG speed which is not to be exceeded. If method 400 judges that the predicted DISG speed is less than the threshold speed, the answer is yes and method 400 proceeds to 411. Otherwise, the answer is no and method 400 proceeds to 414.

Alternatively, or in addition, in some examples method 400 judges whether or not a predicted driveline disconnect clutch power is less than a threshold level. The predicted driveline disconnect power is determined as is described at 426. If the predicted driveline disconnect clutch power is less than the threshold level, the answer is yes and method 400 proceeds to 411.

At 411, method 400 judges if the new gear output torque is within a range of driver expected torque. The driver expected torque may be based off of a DISG torque curve that is a function of DISG speed. In one example, the new gear output torque is within an expected range if DISG predicted speed is less than a speed where DISG transitions from providing a constant maximum torque to providing a constant maximum power. Thus, the new gear output torque is within an expected range if the predicted DISG speed is less than a threshold speed. If method 400 judges that the new gear output torque is within range of a driver expected torque, the answer is yes and method 400 proceeds to 412. Otherwise, the answer is no and method 400 proceeds to 414.

At 412, method 400 allows the transmission to shift to the requested or new gear whether or not the driveline disconnect clutch is engaged or disengaged. If the driveline disconnect clutch is not engaged, it remains in a not engaged state. If the driveline disconnect clutch is engaged, it remains engaged. The transmission may downshift to the requested or new gear by allowing working fluid to flow to a clutch that applies the new gear. Method 400 proceeds to exit after the new gear is applied.

At 414, method 400 judges if the driveline disconnect clutch is closed. In one example, method 400 may judge that the driveline disconnect clutch is closed if a variable in memory is a value of one. Method 400 may judge that the driveline disconnect clutch is open if the variable is a value of one. In other examples, method 400 may judge that driveline disconnect clutch is closed if a pressure of working fluid supplied to the driveline disconnect clutch is greater than a threshold pressure. If method 400 judges that the driveline disconnect clutch is engaged or closed, the answer is yes and method 400 proceeds to 412. Otherwise, the answer is no and method 400 proceeds to 416.

At 416, method 400 closes the driveline disconnect clutch, starts the engine, and accelerates the engine to DISG speed. The driveline disconnect clutch may partially close initially, open, and then fully close when engine speed reaches DISG speed. Alternatively, the driveline disconnect clutch may close to accelerate the engine to DISG speed as spark and fuel are delivered to the engine. Method 400 returns to 414 after the driveline disconnect clutch is closed.

In this way, an open driveline disconnect clutch may be selectively closed so that the driveline disconnect clutch operates in a speed and load range where degradation may be reduced. Further, the driveline disconnect clutch may be closed in anticipation of a subsequent higher driver demand torque. As a result, if the driver demand torque subsequently increases, the driveline may provide increased torque. On the other hand, if the driveline disconnected clutch were not closed in anticipation of a higher demand torque, the driveline disconnect clutch might be closed during conditions where the driveline disconnect clutch could degrade.

Thus, the method of FIGS. 4A and 4B provides for a driveline method, comprising: closing an open driveline disconnect clutch in response to an estimated motor speed after a requested transmission gear downshift, the motor speed estimated before the requested gear downshift occurs. The method includes where a driver is not applying an accelerator pedal during the requested transmission gear downshift. The method includes where the requested transmission gear downshift is a manually requested downshift. The method includes where the requested transmission gear downshift is a downshift requested in a vehicle cruise control mode.

In some examples, the method includes where the requested transmission gear downshift is a request to shift to a lower gear, and where the open driveline disconnect clutch is closed before the lower gear is engaged. The method further comprises supplying spark and fuel to an engine in response to closing the open driveline disconnect clutch. The method further comprises preventing a downshift in response to the estimated motor speed exceeding a threshold speed and not closing the driveline disconnect clutch.

The method of FIGS. 4A and 4B also provides for a driveline method, comprising: predicting a motor speed occurring after a requested gear is engaged at a time before the requested gear is engaged in response to a transmission downshift request; preventing a downshift in response to the predicted motor speed exceeding a threshold value; and closing an open driveline disconnect clutch in response to the predicted motor speed being less than the threshold value. The method includes where the open driveline disconnect clutch is closed in further response to the predicted motor speed being less than a driveline disconnect clutch threshold speed. The method includes where the driveline disconnect clutch threshold speed is a driveline disconnect clutch rated speed (e.g., maximum allowable).

In some examples, the method includes where the open driveline disconnect clutch is closed in further response to an estimate of disconnect clutch power to be transferred through the open driveline disconnect clutch after the open driveline disconnect clutch is closed. The method further comprises engaging a gear in response to the transmission downshift request and the predicted motor speed being less than the threshold value. The method includes where the predicted motor speed is based on the gear. The method also includes where a driver is not applying an accelerator pedal during the requested transmission gear downshift and while the open driveline disconnect clutch is being closed.

As will be appreciated by one of ordinary skill in the art, the methods described in FIGS. 4A and 4B may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline method, comprising:
predicting a motor speed occurring after a requested gear is engaged at a time before the requested gear is engaged in response to a transmission downshift request;
preventing a downshift in response to the predicted motor speed exceeding a threshold value; and
closing an open driveline disconnect clutch in response to the predicted motor speed being less than the threshold value.

2. The method of claim 1, where the open driveline disconnect clutch is closed in further response to the predicted motor speed being less than a driveline disconnect clutch threshold speed.

3. The method of claim 2, where the driveline disconnect clutch threshold speed is a driveline disconnect clutch rated speed.

4. The method of claim 1, where the open driveline disconnect clutch is closed in further response to an estimate of disconnect clutch power to be transferred through the open driveline disconnect clutch after the open driveline disconnect clutch is closed.

5. The method of claim 1, further comprising engaging a gear in response to the transmission downshift request and the predicted motor speed being less than the threshold value.

6. The method of claim 5, where the predicted motor speed is based on the gear.

7. The method of claim 1, where a driver is not applying an accelerator pedal during the requested transmission gear downshift and while the open driveline disconnect clutch is being closed.

8. A driveline system, comprising:
an engine;
an electric machine;
an automatic transmission; and
a controller including executable instructions stored in non-transitory memory configured to:
predict a motor speed occurring after a requested gear is engaged at a time before the requested gear is engaged in response to a transmission downshift request;
prevent a downshift in response to the predicted motor speed exceeding a threshold value; and
close an open driveline disconnect clutch in response to the predicted motor speed being less than the threshold value.

9. The driveline system of claim 8, further comprising allowing the requested gear downshift of the automatic transmission in response to the predicted speed of the electric machine, where the requested gear downshift is declined in response to the predicted speed of the electric machine being greater than a threshold speed, and where the requested gear downshift is allowed in response to the predicted speed of the electric machine being less than the threshold speed.

10. The driveline system of claim 8, further comprising a driveline disconnect clutch and additional instructions for closing the driveline disconnect clutch when the driveline disconnect clutch is open in response to the requested gear downshift and the predicted speed of the electric machine not being less than a threshold speed.

11. The driveline system of claim 10, further comprising additional instructions for supplying spark and fuel to the engine in response to closing the driveline disconnect clutch and rotating the engine.

12. The driveline system of claim 8, further comprising additional instructions for allowing engagement of a new gear in response to the requested gear downshift when the predicted speed of the electric machine is less than a threshold speed and when a predicted output torque of the electric machine is within a predetermined torque range.

13. The driveline system of claim 8, further comprising a driveline disconnect clutch and additional instructions for operating a vehicle in a cruise control mode and closing the driveline disconnect clutch in response to the predicted speed of the electric machine in response to the requested gear downshift.

* * * * *